(12) United States Patent
Bergeron et al.

(10) Patent No.: US 12,462,243 B2
(45) Date of Patent: *Nov. 4, 2025

(54) TRANSACTION CARDS AND COMPUTER-BASED SYSTEMS INVOLVING AN ON-CARD DISPLAY AND MOBILE DEVICE FOR AUTHENTICATING TRANSACTIONS AND METHODS OF USE THEREOF

(71) Applicant: Capital One Services, LLC, McLean, VA (US)

(72) Inventors: George Bergeron, Falls Church, VA (US); Bryant Yee, Silver Spring, MD (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,630

(22) Filed: Apr. 8, 2024

(65) Prior Publication Data
US 2024/0257095 A1    Aug. 1, 2024

Related U.S. Application Data

(63) Continuation of application No. 17/947,999, filed on Sep. 19, 2022, now Pat. No. 11,954,667, which is a
(Continued)

(51) Int. Cl.
*G06Q 20/32* (2012.01)
*G06K 19/07* (2006.01)
(Continued)

(52) U.S. Cl.
CPC ..... *G06Q 20/3274* (2013.01); *G06K 19/0709* (2013.01); *G06K 19/07707* (2013.01); *G06Q 20/341* (2013.01)

(58) Field of Classification Search
CPC ............ G06Q 20/3274; G06Q 20/341; G06K 19/0709; G06K 19/07707
(Continued)

(56) References Cited

U.S. PATENT DOCUMENTS 8,511,547 B2   8/2013  Rans et al.
10,460,221 B1  10/2019 Tucker
(Continued)

*Primary Examiner* — Paultep Savusdiphol
(74) *Attorney, Agent, or Firm* — Greenberg Traurig, LLP

(57) ABSTRACT

Transaction cards, systems and methods involving an on-card display and an associated mobile computing device utilized for authenticating transactions are disclosed. In one embodiment, an exemplary transaction card may comprise transaction circuitry configured to conduct purchase transactions involving a mobile computing device coupled to or associated with the transaction card, communication circuitry configured to communicate with a provider of the transaction card, an e-ink display configured to display a QR code on the transaction card for use in authentication, data storage configured to store the QR code, and computer readable media having instructions for initiating a second-factor authentication process and displaying the QR code on the e-ink display to be captured by the mobile computing device and transmitted to a system or server for validating the second-factor authentication process.

20 Claims, 7 Drawing Sheets

Related U.S. Application Data continuation of application No. 16/884,012, filed on May 26, 2020, now Pat. No. 11,449,855.

(51) Int. Cl.
  *G06K 19/077* (2006.01)
  *G06Q 20/34* (2012.01)

(58) Field of Classification Search
  USPC .......................................................... 235/380
  See application file for complete search history.

(56) References Cited

U.S. PATENT DOCUMENTS

| | | |
|---|---|---|
| 10,496,918 B2 | 12/2019 | Mullen et al. |
| 2013/0311363 A1* | 11/2013 | Ramaci ................. G07F 7/1008 705/41 |
| 2014/0183258 A1* | 7/2014 | DiMuro ............. G06Q 20/3572 235/380 |
| 2014/0337957 A1* | 11/2014 | Feekes .................... H04L 63/18 726/9 |
| 2016/0104148 A1 | 4/2016 | Ganzera et al. |
| 2018/0308116 A1* | 10/2018 | Maggio .............. G06Q 20/3672 |
| 2019/0354986 A1 | 11/2019 | Brimhall et al. |

\* cited by examiner

TRANSACTION CARDS AND COMPUTER-BASED SYSTEMS INVOLVING AN ON-CARD DISPLAY AND MOBILE DEVICE FOR AUTHENTICATING TRANSACTIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved transaction cards, improved computer-based platforms or systems, improved computing cards, components and devices and/or improved computing methods configured for one or more novel technological applications involving an on-card display and an associated mobile computing device utilized for authenticating transactions.

BACKGROUND OF TECHNOLOGY

A computer network platform/system may include a group of computers (e.g., clients, servers, computing clusters, cloud resources, etc.), transaction cards and other computing hardware devices that are linked and communicate via software architecture, communication components, and/or software applications associated with electronic transactions, data processing, and authentication.

SUMMARY OF DESCRIBED SUBJECT MATTER

In some embodiments, the present disclosure provides various exemplary technically improved transaction cards having an on-card display and an associated mobile computing device utilized for authenticating transactions, the transaction card comprising, for example, elements such as:
  transaction circuitry;
    wherein the transaction circuitry is configured to conduct purchase transactions that involve:
      i) a wireless computing device that is in a wireless communication with the transaction card;
      ii) an entity associated with each respective transaction; and
      iii) a server associated with a provider of the transaction card; communication circuitry;
    wherein the communication circuitry is coupled to the transaction circuitry;
    wherein the communication circuitry comprises wireless communication circuitry; and
    wherein the communication circuitry is configured to communicate with the server associated with a provider of the transaction card;
  an e-ink display that is:
    i) coupled to one or both of the transaction circuitry and the communication circuitry to coordinate display of a Quick Response (QR) code;
    ii) configured to display the QR code via e-ink on the transaction card for use in second-factor authentication for online or POS transactions;
  data storage configured to store the QR code;
  a power source configured to supply power to the e-ink display; and
  computer readable media storing instructions that, when executed by at least one processor, cause the transaction card to perform a second-factor authentication process, comprising:
    initiating, when an online purchase transaction is attempted, the second-factor authentication process;
    generating the QR code; and
    displaying the QR code on the e-ink display to be captured by the wireless computing device that transmits an image of the QR code displayed on the e-ink display to the server after initiating the online purchase transaction so that the image of the QR code can be verified by the server to validate the second-factor authentication process.

In some embodiments, the present disclosure also provides exemplary technically improved computer-based systems, computer-implemented methods, and computer-readable media, including media implemented with and/or involving one or more software applications, whether resident on computer devices or platforms, provided for download via a server and/or executed in connection with at least one network such as via a web browser application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may Thus, as described below, various embodiments may be readily combined, without departing from the scope or spirit of the present disclosure.

As set forth in more detail, below, transaction cards, systems and methods involving an on-card display and an associated mobile computing device utilized for authenticating transactions are disclosed. In one embodiment, an exemplary transaction card may comprise card circuitry including transaction circuitry configured to conduct purchase transactions involving a mobile computing device coupled to or associated with the transaction card, communication circuitry configured to communicate with a computer system or server, such as one associated with a provider of the transaction card, an on-card display configured to display a QR code on the transaction card for use in second-factor authentication, data storage configured to store the QR code, and computer readable media having instructions for initiating a second-factor authentication process and displaying the QR code on the e-ink display to be captured by the mobile computing device for transmission to a system or server that validates the second-factor authentication process.

Figure 1:
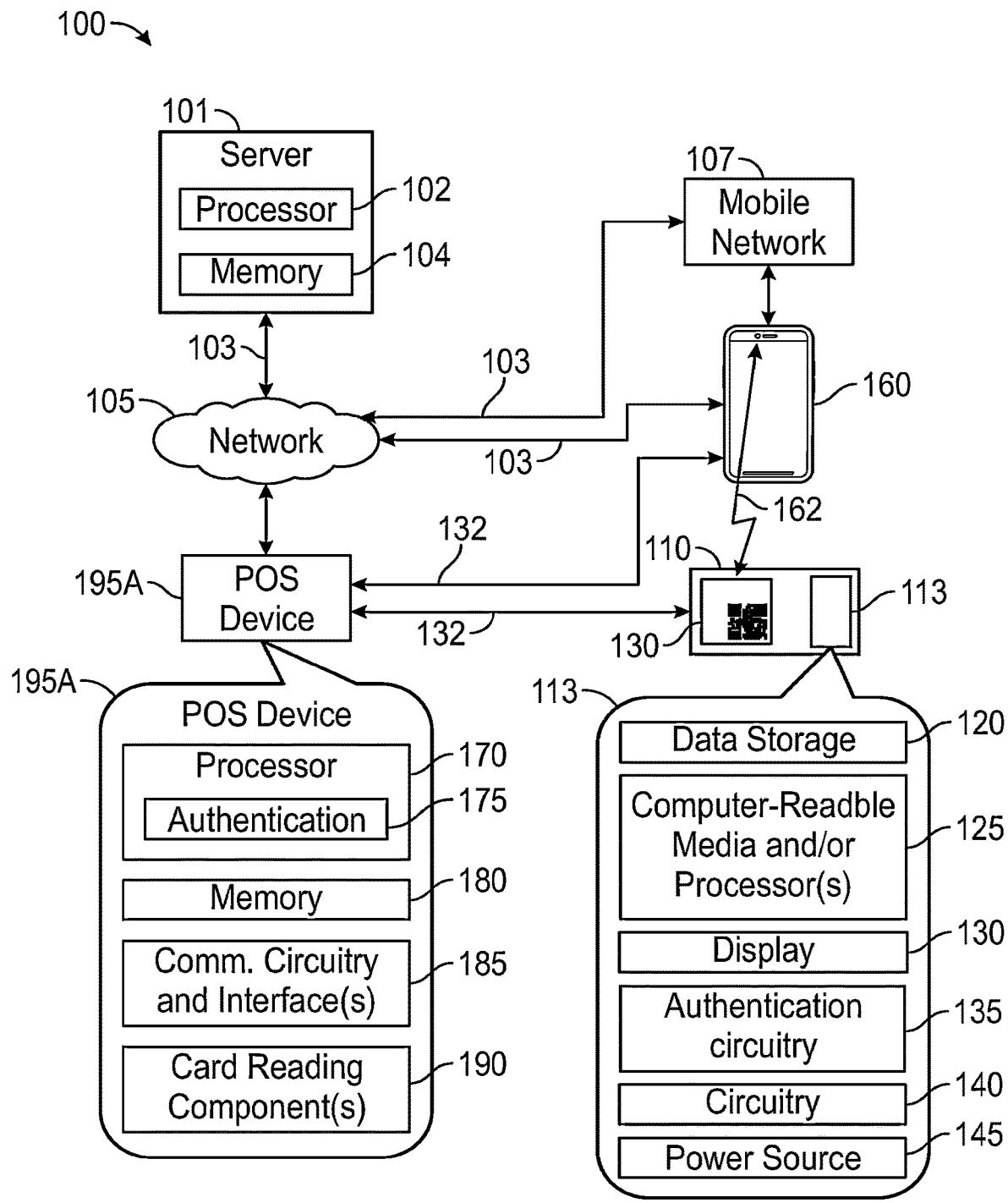
FIG. 1 is a block diagram of an exemplary system and/or platform illustrating a transaction card and associated aspects of authenticating transactions, consistent with exemplary aspects of certain embodiments of the present disclosure.

FIG. 1 depicts an exemplary system 100 for improved authentication associated with use of a transaction card by an individual, in accordance with one or more embodiments of the present disclosure. In some embodiments, system 100 may include a server 101, a mobile device 160, a transaction card 110 having a display 130 as well as electronic card circuitry and components (hereinafter "card circuitry 113") which is technologically improved over a typical consumer credit card. The exemplary system 100 may further include a point-of-service or point-of-sale (POS) device 195A, which may all communicate 103 over a communication network 105. In other embodiments, the transaction card 110 and associated authentication aspects may be utilized in connection with online portal 195B, as shown below in connection with FIG. 3. Turning back to FIG. 1, when a user attempts a transaction with the transaction card 110, one or more entities associated with the transaction may wish to assess whether the transaction is an authorized transaction, e.g., that an approved user of the transaction card 110 is authorizing the particular transaction. Here, for example, such entities may include one or more of the business or merchant associated with the POS device 195A, a financial institution, such as a credit card company that has issued the transaction card 110 to the user, and/or other entities having a stake in approval of the transaction. As set forth below, embodiments herein also leverage the fact that the user of the transaction card 110 may typically carry or is near a mobile device 160, such as their smartphone, tablet, smartwatch, smart bracelet, or any other such mobile computing device, and may utilize functionality associated with the user's mobile device and the transaction card, including interaction between the two, as a part of various authentication processes for approving a transaction and/or authorizing the user to use the transaction card to purchase goods or services.

In some embodiments, server 101 may be associated with one or more entities that are stakeholders to the attempted transaction, such as the business or merchant, one or more financial services providers, such as an issuer of a credit card, debit card, or other transaction card associated with the attempted transaction.

According to embodiments herein, transaction card 110 may include card circuitry 113 including circuitry capable of communicating 132 various card-related information from the transaction card 110 to the POS device 195A and/or other entities and/or computer systems associated with the transaction. In some embodiments, such card-related information may include one or both of: (1) an identifier associated with a known owner of one or both of the card and/or the mobile device; and (2) second-factor authentication information (e.g., a QR code, a digital code, an alphanumerical code) generated and displayed via the transaction card 110.

In the embodiment shown in FIG. 1, an illustrative POS device 195A may comprise: one or more processing components and/or computer readable media 170, memory 180, communication circuitry and/or interfaces 185, and at least one card reading component 190. The card reading component(s) 190 may be configured to read information from the transaction card 110, for example, the at least one card reading component may comprise one or more of a magnetic stripe reader, a chip reader, a first near field communication (NFC) component, and/or other card-reading components known or developed in the field. Communication circuitry and/or interfaces 185 may comprise at least one mobile device transceiver component configured to communicate, during execution of a purchase transaction, with the mobile device 160 presented for payment, the mobile device transceiver component comprising a second NFC component.

With regard to various practical application detailed herein, the processing components and/or computer readable media 170 may be configured to execute instructions associated with processing transactions with a transaction card, such as the transaction card described below in more detail in connection with FIG. 2. In certain embodiments that involve use of the card reading component 190, the POS device may obtain, from one or both of the transaction card 110 and/or the mobile device 160, upon initiation of the transaction information such as an identifier based on a QR code generated by the transaction card, second-factor authentication information, and/or other data, e.g., as set forth below.

In some embodiments, the second-factor authentication information may be transmitted to, for example, a server 101 that may be operated by a financial service provider that is associated with the transaction card 110, a merchant, and/or another entity associated with the transaction, for validation/verification. However, in other embodiments, second-factor authentication may be performed and/or verified locally, e.g., at the POS device. Here, for instance, verifying mechanisms may be provided (e.g., by download) to the POS devices, to provide one or more entities associated with the POS device authentication measures performed at the POS device. Such measures may be useful, for example, in instances where communications or instructions from the server 101 may not be immediate, and/or in any other cases where more direct authentication, such as via nearer-field communication between the mobile device 160 and the POS device 195, are desired, e.g., in cases where immediate or expedited authentication is desired, when reduction or avoidance of network communications is needed, and/or when other such restrictions or needs apply. These embodiments allow merchants and POS devices to determine, by validating the second-factor authentication information received from the transaction card (e.g. via the authentication component 175, using pertinent information locally-stored in the POS device), whether the current transaction is authenticated to confirm it is not a fraudulent transaction.

In some embodiments, the POS device 195A or a merchant may be authorized or configured to scan the QR code off the transaction card 110, such that the second-factor authentication process may be commenced without need for scanning and processing by the mobile device 160 of the card owner. Here, for example, second-factor authentication may be implemented this way when traditional card-based transactions, such as inserting, swiping or tapping a transaction card, are initiating, and it may also be utilized in embodiments where the transaction card 110 generates its own payment code for completing the transaction itself. In the latter embodiments In certain instances, such as, without limitation, when the second-factor authentication information is not verified as the corresponding authentication information, the POS device and/or other computing components involved in the transaction may be configured to decline the processing of the transaction attempted with the transaction card 110.

In some embodiments, the disclosed POS devices, systems, platforms, methods, and computer-readable media herein may include authentication features involving a POS device 195A configured to perform various automated functionality set forth herein. Unlike existing solutions using conventional authentication schemes for POS devices and online transactions, the present disclosure may utilize improved transaction card(s) 110 and associated functionality that may via processing second-factor authentication based on unique QR codes generated by the transaction card, be configured to better detect fraud, both at a physical device (with a physical card present) and for online transactions, at the time of (or shortly after) a transaction is attempted. In these and other ways, implementations involving the present transaction card and POS device 195 or online portal 195B, and associated features, functionality, and second-factor authentication mechanisms represent improvements over existing fraud detection and/or authentication for card-based transactions.

The disclosed implementations for authenticating a transaction (both with and without a transaction card present) also improves utilization of both processing and communication resources. As an initial matter, the present embodiments may quickly and precisely verify second-factor authentication information from a transaction card on the local POS device or at an online portal to authenticate the transaction card and information associated therewith. Moreover, the graphical (e.g., QR) verification codes herein provide substantially increased security, versus cards that may use numeric and/or alphanumeric numbers and/or codes, as such fundamental (numeric/alphanumeric) information never needs to be entered, revealed, or otherwise exposed to provide openings for fraud to be performed once such alphanumeric information is shared or compromised. Embodiments herein may also obviate communication bandwidth otherwise used for network access during the transaction to perform authentication, such as with prior systems, e.g., those that require contact with a financial institution to perform various second-factor authentication schemes, often involving transmission of inquiries and/or instructions back to the POS device to approve the transaction. Such benefits are achieved by embodiments that include generating a QR code on the transaction card 110, and displaying a QR code on the transaction card for being communicated to verification. Further, because present embodiments need only perform a straightforward generation and display of second factor authentication in connection with a transaction card, without involving the many additional entities and computer systems outside/beyond the POS device/online portal, the processing and compute resources required are reduced substantially compared to existing techniques for second-factor authentication performed for POS device and/or online transactions, which often involve, e.g., pushing a notification to and eliciting a response from the card owner. Moreover, improved transaction cards, POS devices, online transaction portal with the disclosed authentication mechanisms improve responsiveness, efficiency, accuracy, robustness, autonomous and/or fault-tolerance ability of providing authentication and/or detecting fraud in connection with transaction cards. Implementations herein also reduce likelihood of merchant exposure to fraud involving cards and/or mobile devices, as well as exposure to fraud due to delays or "lag time" caused by communication or network intermittent availability or failures, thereby reducing or eliminating the need for communicating with one or more specific, remote entities at the moment of the transaction to make an authentication determination.

Turning back to FIG. 1, server 101 may include at least one processor 102 and a memory 104, such as random-access memory (RAM). In some embodiments, server 101 may be operated by the financial institution issuing the transaction card, by the merchant, and/or by any transaction clearing house involved with authorizing the credit card and/or transaction.

In some embodiments, the exemplary transaction card 110 may be formed from plastic, metal, or any other suitable material. Transaction card 110 may include card circuitry 113 formed directly therein, and/or disposed therein by gluing, bonding or by any suitable adhesion method for affixing circuitry to the material of transaction card 110. Card circuitry 113 may be configured to utilize any hardwired circuitry. Card circuitry 113 may be implemented as one or more integrated circuit chips, and/or electronic devices, electrically interconnected and bonded to one or more circuit boards, for example. Further details and embodiments of exemplary transaction cards are shown and described in connection with FIG. 2, below.

Referring to the block diagram of FIG. 1, card circuitry 113 may include a data storage 120, computer readable media 125, a display 130 for displaying second factor authentication information (e.g., a QR code and/or information), authentication circuitry 127, other circuitry 140 such as transaction circuitry and/or communication circuitry, and a power source 145. Data storage 120 may be configured to store the second factor authentication information such as the QR code(s).

Computer readable media 125 may store instructions, which when executed by a processor may cause the processor to implement generating a QR code, and/or displaying a QR code, and/or other, related schemes herein (such as pairing with mobile device 160) to perform second-factor authentication. In some embodiments, computer readable media 125 may store instructions, which when executed by a processor may cause the processor to implement, such as when an online purchase transaction is attempted, initiating the second-factor authentication process, generating the QR code, and displaying the QR code on the display 130. According to embodiments herein, for example, the QR code may be generated and displayed for capture by a device and transmission by the device to a computing component that processes the QR code to authenticate the transaction. In some embodiments, the QR code is captured as an image and transmitted after the online purchase transaction is initiated. Further, the QR code may be transmitted such that the QR code can be verified by the server to validate the second-factor authentication process prior to approving the transaction. In some other embodiments, the wireless computing device 160 is utilized to capture the QR code as displayed on the display.

In embodiments described above, the second factor authentication process may involve a mobile device 160 transmitting the QR code to the server, upon generation, for use in validating the second-factor authentication process. However, in other embodiments, the QR code may be transmitted directly by the transaction card.

In some embodiments, the QR code may be generated by the transaction card 110 and a copy of the QR code may be transmitted and/or maintained at the server to authenticate transactions. In other embodiments, the QR code, or computer programming to generate such codes, may be provided to the transaction card by a server or other computer system, such as one associated with a provider of the transaction card.

As set forth in more detail, below, such features provide means to verify whether or not an attempted use of the transaction card 110 is an authorized use of the card, enabling ready determination that such use is not a fraudulent use such as use at a POS device by an individual who has stolen or replicated a card, use for an online transaction where a fraudster has fraudulently obtained traditional card information such as credit card number, PAN, and the like. Upon receipt and authentication of a unique identifier, such as a QR code, transactions may be more readily and accurately approved, such as when the user attempts to use the transaction card to purchase goods and/or services at POS device 195A, and/or at an online transaction portal 195B.

Transaction circuitry of circuitry 140 may be configured to conduct purchase transactions that involve one or more of: i) a mobile/wireless computing device that is coupled to or associated with the transaction card; ii) an entity associated with each respective transaction; and iii) a server, such as one associated with a provider of the transaction card. In some embodiments, the transaction circuitry may be configured to generate a new version of the QR code periodically. Other circuitry and/or the computer readable media may do this, as well. In other embodiments, the transaction circuitry may be configured to generate a new version of the QR code per each transaction attempted. In some embodiments, the transaction circuitry may be configured to initiate the second-factor authentication process when a transaction amount exceeds a pre-determined threshold amount. In other embodiments, the transaction circuitry may be configured to securely generate new QR codes, in real time, when an amount of the current online transaction exceeds a specified threshold.

Communication circuitry may be configured to configured to communicate with the server associated with a provider of the transaction card. In some embodiments, communication circuitry may be coupled to the transaction circuitry. In various embodiments, the communication circuitry may include wireless communication circuitry, which may operate using various wireless media and/or technologies, examples of which are set forth further below. In cases where the QR code is generated periodically or at the time of an attempted transaction, the communication circuitry may communicate a current version of the QR code to the computing component that performs the second-factor authentication, such as a server. Depending on the embodiment or circumstances, such QR code may be communicated to the relevant computing component(s), before, during or even after a transaction. Here, for example, when a network connection is not available, the QR code is still generated and should be captured by the card owner via their mobile device 160, e.g., where the transaction is conditionally approved. Then, when a network connection becomes available, the mobile device 160 can transmit the scanned QR code to the computer system or server, to be synched later and/or done offline, to verify the second-factor authentication. In some embodiments, such QR code is communicated using encryption or other security that prevents the shape of the actual QR code from being replicated or reverse engineered, i.e., for possible fraudulent use.

In some embodiments, the communication circuitry may be configured to communicate with an app, such as an app associated with a provide of the transaction card installed on the mobile device 160, which may enable the provider of the transaction card to one or both of: (i) receive information regarding the transaction card and associated transactions, and/or (ii) send one or more of communications, new QR codes, updates, and other information to the transaction card. In other embodiments, the app may be installed on any network-connected computing device or accessory (e.g., smart watch, smart jewelry, etc.) of the user having an imaging component capable of reading the QR code and a communication component configured to transmit the QR code to be used in authentication.

In some embodiments, the display 130 may be configured to be coupled to the card circuitry 140, such as one or both of the transaction circuitry and the communication circuitry, to coordinate display of second factor authentication information. In some embodiment, display 130 may be an e-ink display that is configured to display the second factor authentication information, e.g., the Quick Response (QR) code, on the transaction card for use in second-factor authentication for online or POS transactions Quick Response (QR) code.

In some embodiments, power source 145 may be used to provide power to the card circuitry 113. For example, power source 145 may be configured to supply power to the display 130. Power source 145 may include, for example, a battery, a solar cell, and/or any suitable energy harvesting device, capable of generating enough power for powering card circuitry 113, such as at least the display 130 to enable display of a QR code in connection with a transaction. In other embodiments, the transaction card may be powered upon swiping or inserted the card into a slot in POS terminal 195A such that the power may be supplied by, or the power source may be, the POS terminal 195A itself or any other device into which the transaction card is swiped or inserted.

The transaction card 110 may also be powered by movement, or by induction, or by other near-field electromagnetic energy derived from nearby sources, such as mobile device 160, POS device 195A, or other known sources. Once powered, the transaction card 110 may display the QR code for capture by the mobile device 160.

Mobile device 160, such as a smart phone or other portable or wearable electronic device, may include mobile device circuitry. Mobile device circuitry may include a mobile device processor, memory, such as RAM, communication circuitry and interface, and any input and/or output device, such as a touchscreen display. Memory or other computer readable media of the mobile device 160 may store code that, when executed by processor, may cause processor to implement aspects of one or more fraud detections schemes herein, including those involving pairing with transaction card 110 to verify the QR code generated by the transaction card 110, e.g., to authorize a transaction or use of the card. In some embodiments, any transaction card application running on mobile device 160, such as an application supplied by a financial institution issuing the transaction card and/or managing the transactions of the transaction card user, may include various modules that may transmit information over various networks (such as wireless/wifi networks, to communicate with mobile networks 107 and/or servers 101, near-field networks, to communication with the POS devices 195A, etc.), communicate information with various entities, such as financial institutions (e.g., via server 101), and/or communicate with any other computing components in range.

Various embodiments associated with FIG. 1 and related disclosure herein solve, for example, one technical problem of ensuring that a transaction card is only used for a transaction that is authorized by the owner or authorized user of the transaction card, i.e., a person in possession of a mobile device 160 or other such computing component configured to perform the authorization herein. Various features and functionality disclosed herein may be utilized in connection with authentication processes that involve pairing of a technologically improved transaction card 110 with mobile device 160 when implementing second- and/or multi-factor authentication (MFA) schemes, for example to authorize use of the card for the subject transaction. In other embodiments, various information related to the successful pairing of the transaction card and the mobile device may be relayed back to server 101 (e.g., server processor 102) so as to approve transactions for purchasing goods and/or services, given the authorization and added security provided via confirmation of the QR code.

In some embodiments, an initial process for associating, coupling or pairing the transaction card with the mobile device 160 may be implemented by the user communicating with the provider or financial institution via an app on the user's mobile device to approve the pairing of transaction card 110 with mobile device 160. Further, the pairing and/or unpair processes between the transaction card 110 and the mobile device 160 may be configured to be performed automatically and seamlessly such as without any action on the part of the user, particularly if the same mobile device was previously associated with the card owner and/or other transaction cards of the owner in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the mobile device that the card owner wishes to use.

In some embodiments, such as when the transaction card 110 includes a battery as a power source 145, the transaction card 110 and the mobile device 160 may be configured to pair with the transaction card on the fly, e.g., when the transaction card is used during a transaction, so as to conserve power stored in the battery.

In some embodiments, if the transaction card 110 information (e.g., the credit card number, CVV, or PAN information) is determined to be in possession by an unauthorized individual via implementations herein, e.g. at/via POS device 195A, and/or an online transaction portal 195, an entity associated with the transaction, such as the merchant deploying the POS terminal 195A, or the merchant hosting the online transaction service, may generate or receive an alarm or alert that the attempted transaction and/or card user is unauthorized, or potentially unauthorized (e.g., an alert on a display of POS terminal 195A or online transaction portal 195B) or that still further authentication, such as additional-factor authentication, should be performed to verify that the transaction is not fraudulent.

Figure 2:
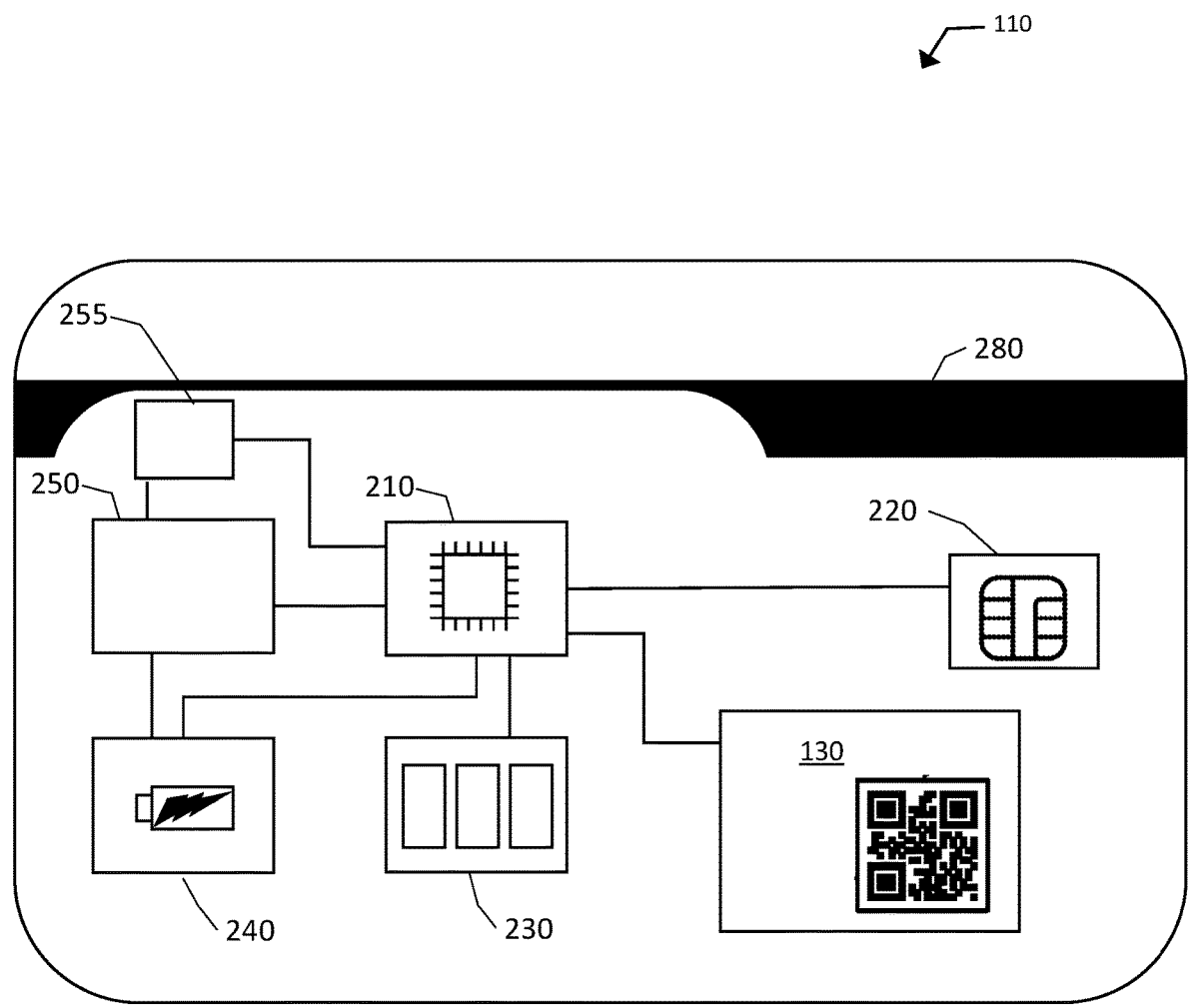
FIG. 2 is a block diagram of an exemplary transaction card, consistent with exemplary aspects of certain embodiments of the present disclosure.

FIG. 2 shows a diagram of an exemplary transaction card 110, consistent with disclosed embodiments. In some embodiments, transaction card 110 may be the approximate size and shape of a traditional credit card, debit card, or the like. In certain embodiments, only a portion of the transaction card 110 need be dimensioned to be operable with a card reader, e.g., if a non-traditional shape is desired for aesthetic or other reasons. Transaction card 110 may have embedded electronics for performing various aspects of the present disclosure. As shown, transaction card 110 may include at least one processor 210 or processing circuitry, memory 230 or computer readable media, power source or power circuitry 240, optionally, one or more sensors 250, communication circuitry/devices 255, a display 130, a magnetic stripe 280, and other coupling circuitry 220 such as an electronic chip element. Power source or power circuitry 240 may include elements that generate power for the display 130 to display information, and/or for the card. In some embodiments, such power may generated and/or initiated upon coupling to a POS device 195A, such as by connection via an electronic chip, at 220, and/or such circuitry may include a voltage supply such as a battery. In some embodiments, transaction card 110 may include more or fewer components than shown in FIG. 2.

Processor 210 may comprise one or more known or specialized processing devices, of sufficient size and form factor to fit within and/or be integrated with transaction card 110, such as when configured to be about the size of a traditional credit or debit card. In some embodiments, processor 210 may include any configuration capable of performing functions related to the disclosed methods such as, for example, initiating a second-factor authentication process, generating a QR code, displaying a QR code on the display 130, associated with usage of the transaction card 110 described herein. Processor 210 may also control display 130, control power source 240, send and receive data, read from and written to memory 230, process information or instructions associated with the coupling circuitry 220, and any other functions consistent with the disclosed embodiments.

Memory 230 (also referred to as data storage herein) may include volatile or non-volatile, magnetic, semiconductor, or other type of storage elements and/or tangible (i.e., non-transitory) computer-readable media that stores relevant data, such as information needed for or associated with conducting card transactions. With regard to the second factor authentication information (e.g., a QR code) generated by the card, such information may be stored in such memory or data storage of the card, which may be encrypted or otherwise secured, and/or it may be transformed, e.g., by hash, fuzzy-hash, etc., for transmission to the server.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy. In some implementations, power source 240 may include rechargeable power supply. For example, power source 240 may include a wireless rechargeable power supply.

The display 130 may comprise a screen, indicator light, or other appropriate device for displaying a QR code, status or message to the card owner. In some embodiments, display 130 may include a small LCD screen, e-ink screen, or OLED display or one or more other light emitting diode (LED) elements. In some embodiments, a QR code is generated and/or displayed as unique graphical information that is only decipherable by the server. Display 130 may also be configured to provide notifications, prompts, and/or messages to user, such as those associated with generation and/or use of a QR code on the transaction card 110, as described herein.

In some embodiments, transaction card 110 may include communication circuitry/devices 255 such as antennae and/or NFC (near-field communication) circuitry, for transmitting and/or receiving data from one or more external devices and/or locations. Communication circuitry 255 may comprise a short-range wireless transceiver, or a near-field communication chip. Communication circuitry 255 may be configured to communicate with mobile device 160, a contactless card reader associated with the POS device 195, other systems, and/or other sensors configured to authenticate transaction card 110. Communication circuitry may also be configured to communicate with external circuitry and/or systems by non-wireless connection, such as via electronic chip element of coupling circuitry 220.

In some embodiments, transaction card 110 may include at least one magnetic stripe 280 or other magnetic communication medium that may share or read magnetically-stored information. In some embodiments, magnetic stripe 280 may also be controlled by processor 210. For example, processor 210 may write, clear, and rewrite magnetic stripe 280, to provide particular account information, such as specific account information to use in connection with a QR code being generated on the display 130.

Further, in other embodiments, a QR code may also be generated and utilized as an actual form of payment to authorize a transaction. Such QR codes may be used in a similar way that a payment app on a phone is used, though the transaction card 110 itself may both generate and display a unique QR code, such as a one-time code, that is read by a merchant to obtain payment for goods or services. Similar implementations may be utilized with business where a plurality of charges or add-on charges would benefit from individual authorization, such as at bars, where the QR code is scanned and sent to the provider of the transaction card 110, for second-factor authentication, to verify and approve the supplemental charge.

Figure 3:
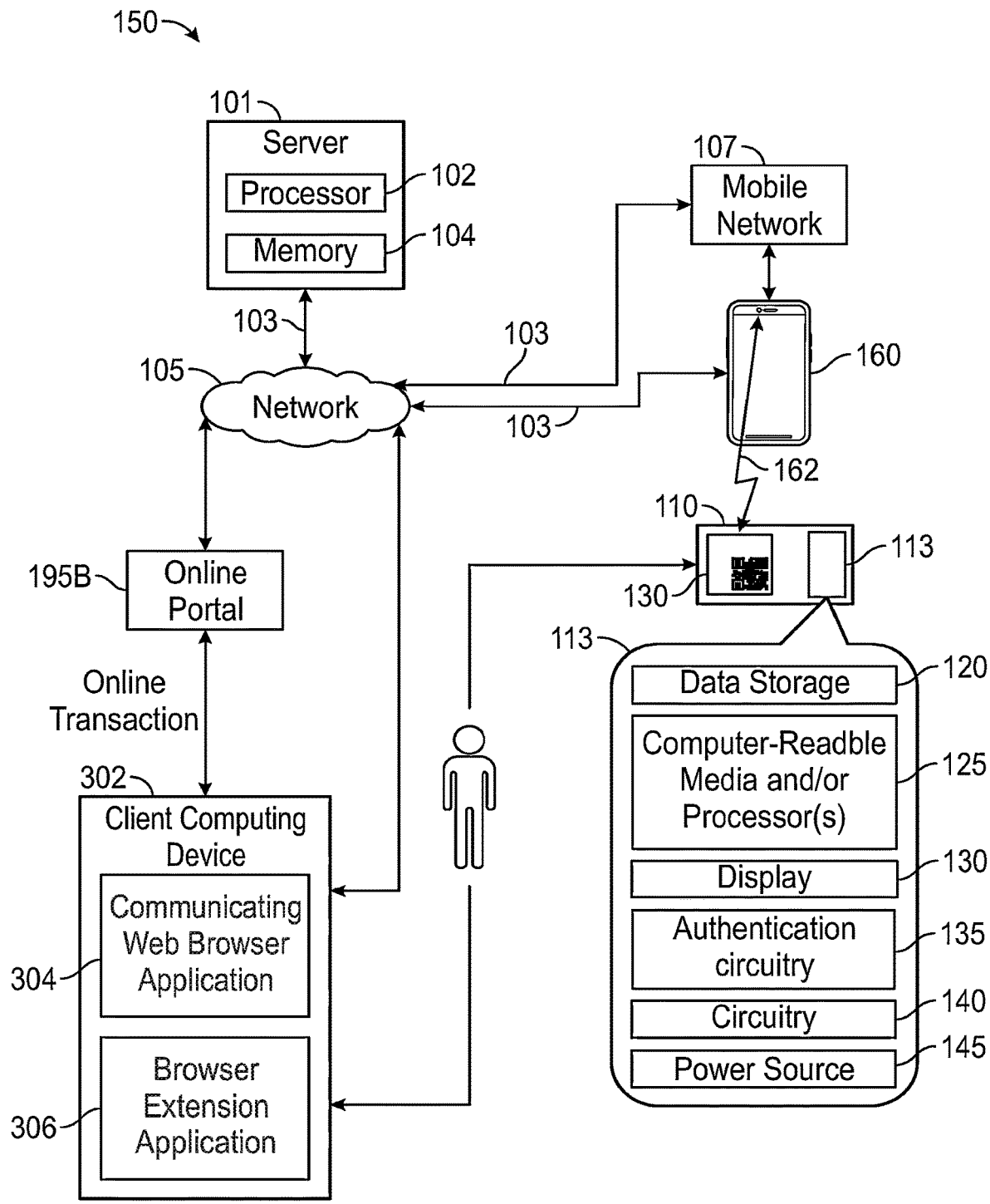
FIG. 3 is a block diagram of another exemplary system and/or platform illustrating a transaction card and associated aspects of authenticating transactions, consistent with exemplary aspects of certain embodiments of the present disclosure.

FIG. 3 depicts an exemplary system 150 for improved authentication associated with use of a transaction card by an individual, in accordance with one or more embodiments of the present disclosure. FIG. 3 is similar to FIG. 1, though illustrating embodiments where the transaction card 110 is utilized for conducting transactions with an online portal 195B, instead of a POS device 195A, as shown and discussed above. In some embodiments, system 150 may include a server 101, a mobile device 160, a transaction card 110 having a display 130 and card circuitry/components 113 (i.e., card circuitry 113), a client computing device 302, as well as an online portal 195B, which may all communicate 103 over a communication network 105. FIG. 3 illustrates embodiments where security concerns regarding use of a transaction card 110 are heightened, versus use at a POS device 195A, since credit card transactions online are more subject to fraud, e.g., since a fraudster may readily obtain and use numeric and/or alphanumeric information associated with a transaction card, such as by skimming, etc. According to some embodiments, when a transaction card 110 is used to attempt an online transaction, instructions and/or push notifications to both the transaction card 110 and the mobile device 160 may be generated a provider of the transaction card. Here, for example, these instructions or notifications would cause the QR code to be generated on the transaction card 110, while a push notification would be sent to an app on the mobile device 160, requesting the card owner to scan the QR code. The transaction card 110 may also be configured to be activated, such as via the app or other control associated with the card itself, to generate the QR code needed for a desired transaction. Finally, the various other features and functionality associated with utilizing such second-factor authentication processes with an online portal 195B may be consistent with those described above in connections with FIGS. 1 and 2.

Figure 4:
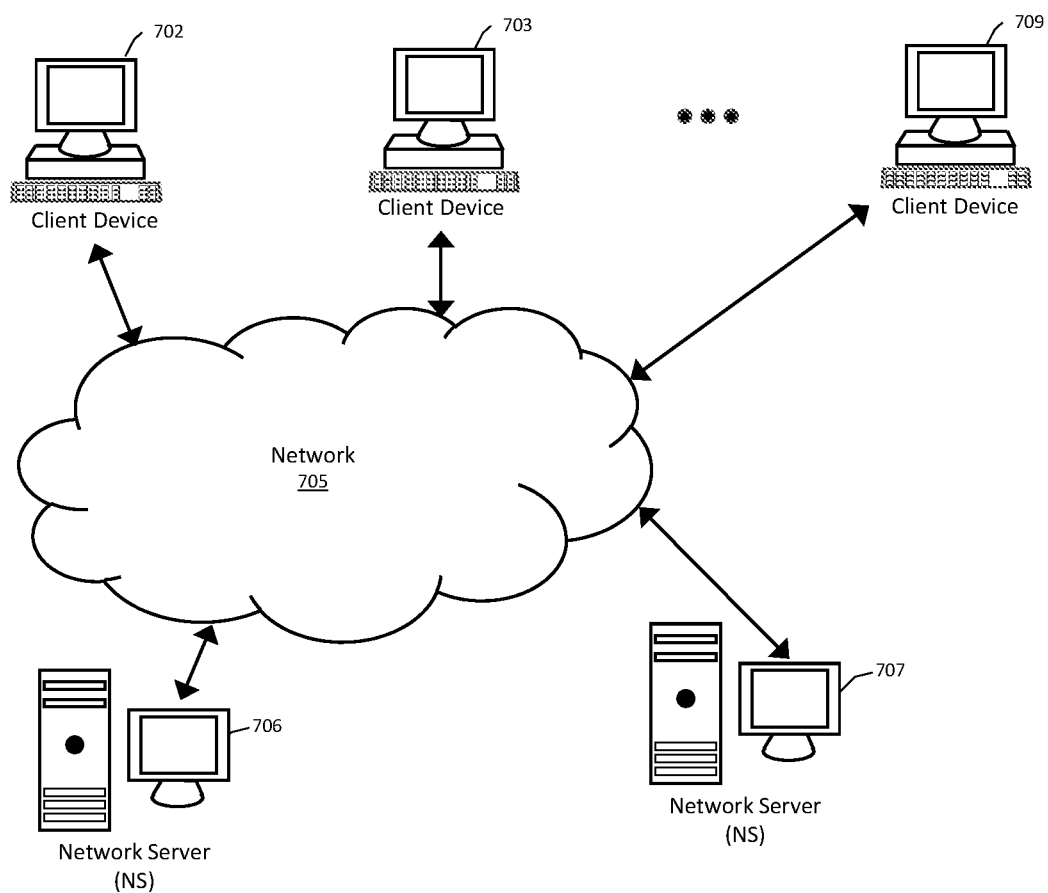
FIG. 4 is a block diagram depicting an exemplary computer-based system and/or platform, in accordance with certain embodiments of the present disclosure.

FIG. 4 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, clients such as client devices 702 through 709 (e.g., POS devices and/or client computing devices, etc.) of the exemplary computer-based system/platform may include virtually any computing device capable of receiving and sending communications over a network (e.g., cloud network, etc.), such as network 705, to and from another computing device, such as servers 706 and 707, each other, and the like. In some embodiments, the member devices 702 through 709 may be POS (point of sale, point of service, etc.) devices, personal computers, multiprocessor systems, microprocessor-based or programmable consumer electronics, network PCs, and the like. In some embodiments, one or more devices within client devices 702 through 709 may include computing devices that typically connect via wired connection and/or wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more client devices of client devices 702 through 709 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within client devices 702 through 709 may include may run one or more applications, such as Internet browsers, mobile applications, voice calls, video games, videoconferencing, and email, among others. In some embodiments, one or more member clients of client devices 702 through 709 may be configured to receive and to send web pages, and the like. In some embodiments, an exemplary specifically programmed browser applications, such as any associated with online transactions of the present disclosure, may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device of client devices 702 through 709 may be specifically programmed by either Java, .Net, QT, C, C++ and/or other suitable programming language. In some embodiments, one or more client devices within client devices 702 through 709 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, one or both of the exemplary server 706 and/or the exemplary server 707 may be a web server (or a series of servers) running a network operating system, examples of which may include but are not limited to Microsoft Windows Server, Novell NetWare, or Linux. In some embodiments, the exemplary server 706 and/or the exemplary server 707 may be used for and/or provide cloud and/or network computing. Although not shown in FIG. 4, in some embodiments, the exemplary server 706 and/or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the client devices 702 through 709.

In some embodiments and, optionally, in combination of any embodiment described above or below, for example, one or more exemplary client devices 702 through 709, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
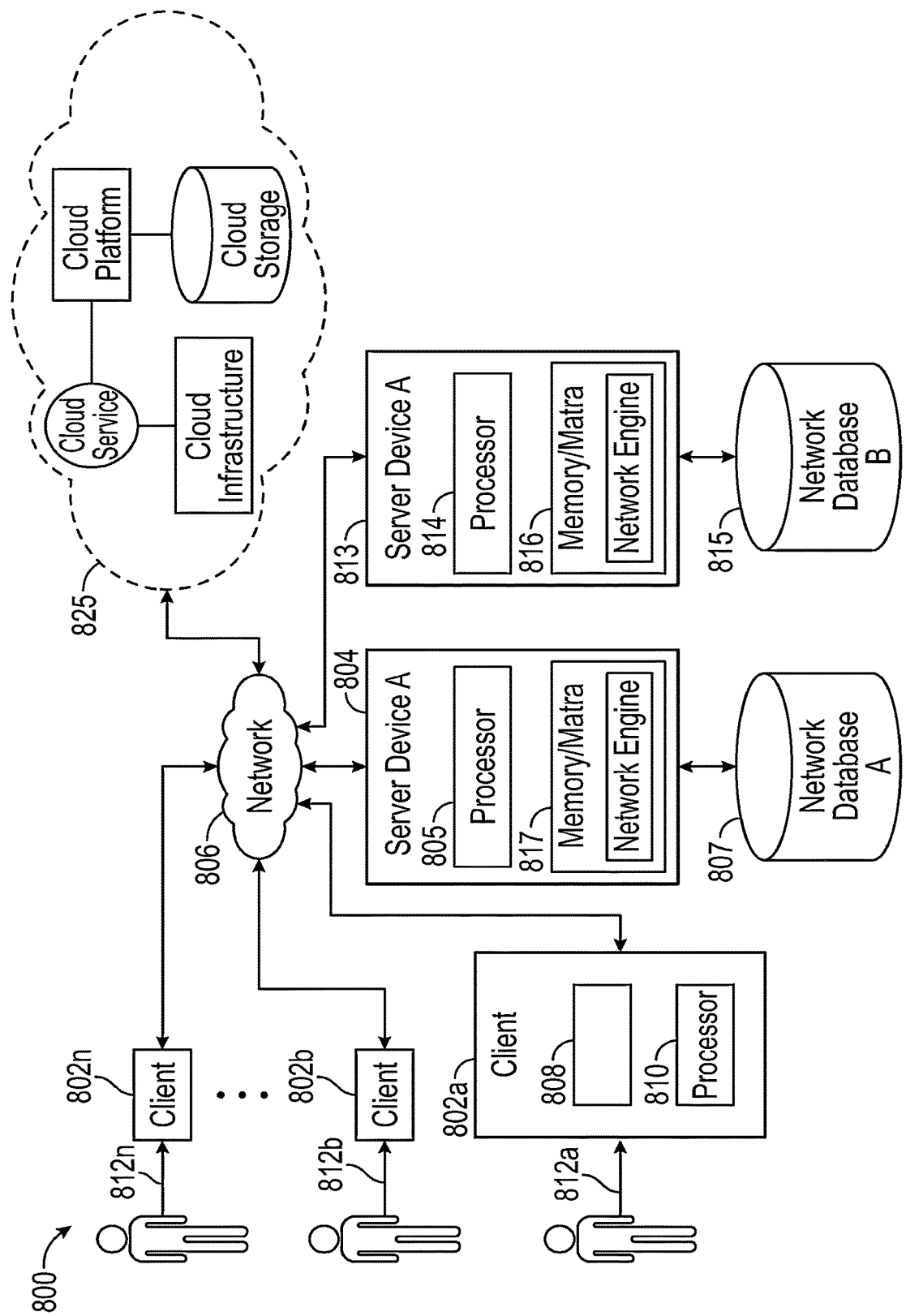
FIG. 5 is a block diagram depicting another exemplary computer-based system and/or platform, in accordance with certain embodiments of the present disclosure.

FIG. 5 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client or member computing devices 802a, 802b through 802n shown each at least includes a storage and/or computer-readable media component 808, which may include memory such as random-access memory (RAM), coupled to a processor 810. In some embodiments, the processor 810 may execute computer-executable program instructions stored in such storage and/or media 808. In some embodiments, the processor 810 may include a microprocessor, an ASIC, and/or a state machine. In some embodiments, the processor 810 may include, or may be in communication with, media, for example computer-readable media (at 808 and/or elsewhere), which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of any such client, with computer-readable instructions. In some embodiments, other examples of suitable media may include, but are not limited to, CD-ROM, DVD, magnetic disk, memory chip, ROM, RAM, an ASIC, a configured processor, all optical media, other disk storage, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, client computing devices 802a through 802n may also comprise a number of external or internal devices such as a mouse, a CD-ROM, DVD, a physical or virtual keyboard, a display, or other input or output devices. In some embodiments, examples of client computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, client computing devices 802a through 802n may be specifically programmed with one or more application programs in accordance with one or more principles/methodologies detailed herein. In some embodiments, client computing devices 802a through 802n may operate on any operating system capable of supporting a browser or browser-enabled application, such as Microsoft™, Windows™, and/or Linux. In some embodiments, client computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the client computing client devices 802a through 802n, users, 812a through 812n, may communicate over the exemplary network 806 with each other and/or with other systems and/or devices coupled to the network 806. As shown in FIG. 5, exemplary server devices 804, 813 and, in some embodiments, one or more cloud components 825 may be also coupled to the network 806. In some embodiments, one or more client computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
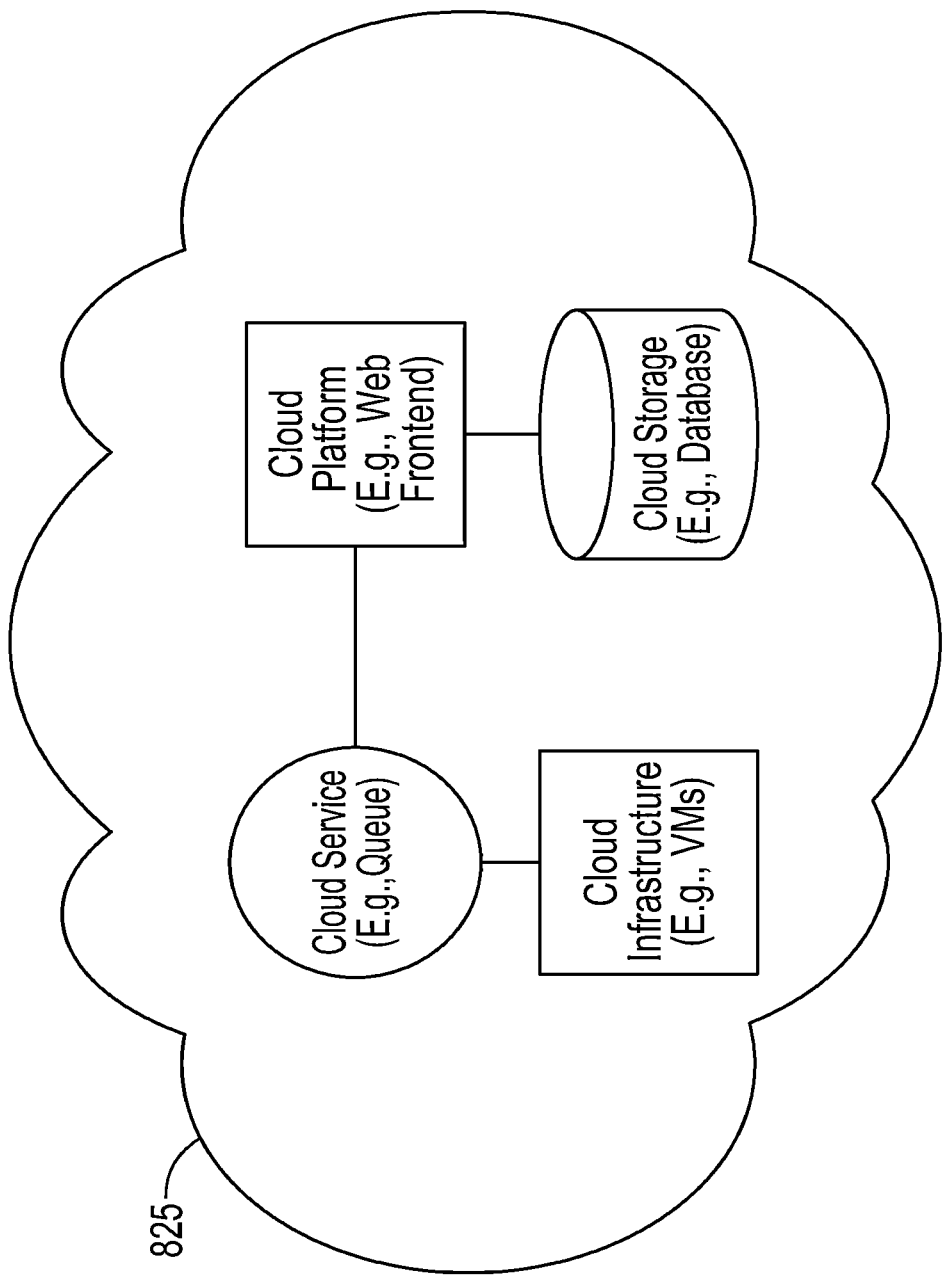
FIGS. 6 and 7 are diagrams illustrating two exemplary implementations of cloud computing architecture/aspects with respect to which various technological applications may be specifically configured to operate, in accordance with certain embodiments of the present disclosure.

As also shown in FIGS. 5 and 6, some embodiments of the present disclosure may also include and/or involve one or more cloud components 825, which are shown grouped together in the drawing for sake of illustration, though may be distributed in various ways as known in the art. Cloud components 825 may include one or more cloud services such as software applications (e.g., related to the online service, etc.), one or more cloud platforms (e.g., a Web front-end, etc.), cloud infrastructure (e.g., virtual machines, etc.), and/or cloud storage (e.g., cloud databases, etc.).

Figure 7:
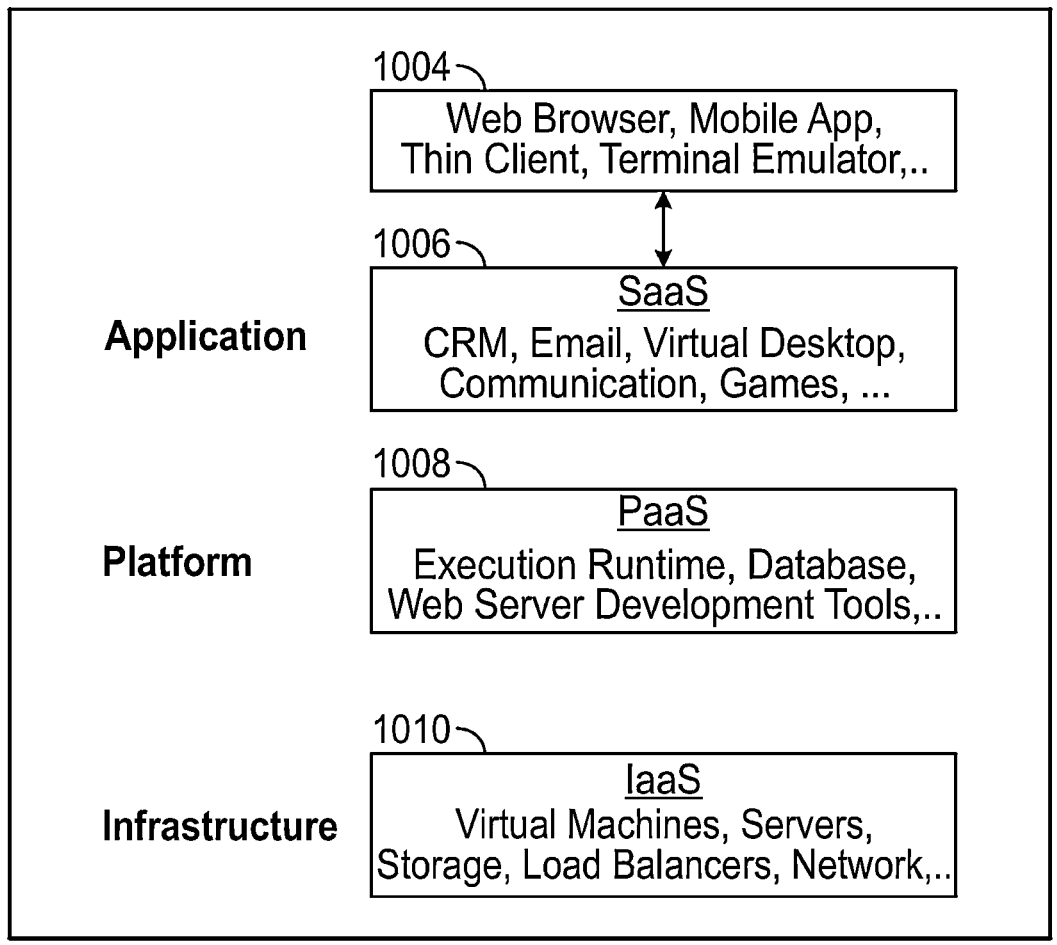

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 5-7 illustrate diagrams that illustrate aspects of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the network communication aspects, e.g. as shown at 1004, to achieve various technological applications described herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and the term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices, and circuitry of transaction cards 110 herein are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include transaction cards 110 that involve wireless, e.g., Bluetooth™ and/or NFC, circuitry and/or communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., as shown in FIGS. 5-7) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) Linux, (2) Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A transaction card comprising:
transaction circuitry;
   wherein the transaction circuitry is configured to conduct purchase transactions that involve:
     i) a computing device, e.g. a mobile computing device, a wireless computing device, etc., that is associated with (e.g., paired with, coupled to, in wireless communication with, etc., the transaction card;
     ii) an entity associated with each respective transaction; and
     iii) a server associated with a provider of the transaction card; communication circuitry;
   wherein the communication circuitry is coupled to the transaction circuitry;
   wherein the communication circuitry comprises wireless communication circuitry; and
   wherein the communication circuitry is configured to communicate with the server associated with a provider of the transaction card;
an e-ink display that is:
   i) coupled to one or both of the transaction circuitry and the communication circuitry to coordinate display of a Quick Response (QR) code;
   ii) configured to display the QR code via e-ink on the transaction card for use in second-factor authentication for online or POS transactions;
data storage configured to store the QR code;
a power source configured to supply power to the e-ink display; and
computer readable media storing instructions that, when executed by at least one processor, cause the transaction card to perform a second-factor authentication process, comprising:
   initiating, when an online purchase transaction is attempted, the second-factor authentication process;
   generating the QR code; and
   displaying the QR code on the e-ink display to be captured by the wireless computing device that transmits an image of the QR code displayed on the e-ink display to the server after initiating the online purchase transaction so that the image of the QR code can be verified by the server to validate the second-factor authentication process.

Clause 2. The transaction card of clause 1 or any clause herein, wherein the second factor authentication process further comprises:
transmitting, by the transaction card, the QR code to the server, upon generation, for use in validating the second-factor authentication process.

Clause 3. The transaction card of clause 1 or any clause herein, wherein a copy of the QR code is maintained at the server to authenticate transactions.

Clause 4. The transaction card of clause 1 or any clause herein, wherein the server associated with a provider of the transaction card provides, to the transaction card, the QR code used to authenticate transactions.

Clause 5. The transaction card of clause 1 or any clause herein, wherein the transaction card:
   i) generates the QR code, on-card; and
   ii) transmit the generated QR code to the server, during the online transaction, for use in the second-factor authentication process.

Clause 6. The transaction card of clause 1 or any clause herein, wherein the QR code is generated as unique graphical information that is only decipherable by the server.

Clause 7. The transaction card of clause 1 or any clause herein, wherein the power supply is rechargeable power supply capable of being wirelessly recharged.

Clause 8. The transaction card of clause 1 or any clause herein, wherein the transaction circuitry is configured to generate new version of the QR code periodically, and
   wherein, during the online transaction, the communication circuitry communicates a current version of the QR code to the server using encryption.

Clause 9. The transaction card of clause 1 or any clause herein, wherein the transaction circuitry is configured to initiate the second-factor authentication process when a transaction amount exceeds a pre-determined threshold amount.

Clause 10. The transaction card of clause 1 or any clause herein, wherein the communication component is configured to communicate with an app, installed on the wireless computing device and associated with the provider of the transaction card, which enables the provider to one or both of: (i) receive information regarding the transaction card and associated transactions, and/or (ii) send one or more of communications, new QR codes, updates, and other information to the transaction card.

Clause 11. The transaction card of clause 1 or any clause herein, wherein the transaction circuitry is configured to securely generate new QR codes, in real time, when an amount of the current online transaction exceeds a specified threshold.

Clause 12. A transaction card comprising:
transaction circuitry;
   wherein the transaction circuitry is configured to conduct purchase transactions that involve:
     i) a computing device, e.g. a mobile computing device, a wireless computing device, etc., that is associated with (e.g., paired with, coupled to, in wireless communication with, etc., the transaction card;
     ii) an entity associated with each respective transaction; and
     iii) a server associated with a provider of the transaction card; communication circuitry;
   wherein the communication circuitry is coupled to the transaction circuitry;
   wherein the communication circuitry comprises wireless communication circuitry; and
   wherein the communication circuitry is configured to communicate with the server associated with a provider of the transaction card;
an e-ink display that is:
   i) coupled to one or both of the transaction circuitry and the communication circuitry to receive, or to coordinate display of, a Quick Response (QR) code, wherein a copy of the QR code is maintained at the server to authenticate transactions;
   ii) configured to display the QR code via e-ink on the transaction card to provide second-factor authentication for online transactions;
data storage configured to store the QR code;
a power source configured to supply power to the e-ink display; and
computer readable media storing instructions that, when executed by at least one processor, cause the transaction card to perform a second-factor authentication process, comprising:
   transmitting, when an online purchase transaction is attempted, authentication information related to conducting the second-factor authentication; and displaying the QR code on the e-ink display to be captured by the wireless computing device that transmits an image of the QR code displayed on the e-ink display to the server after initiating the online purchase transaction so that the image of the QR code can be compared to the copy of the QC code maintained at the server.

Clause 13. The transaction card of clause 12 or any clause herein, wherein the server associated with a provider of the transaction card provides, to the transaction card, the QR code used to authenticate transactions.

Clause 14. The transaction card of clause 12 or any clause herein, wherein the transaction card:
i) generates the QR code, on-card; and
ii) transmit the generated QR code to the server, during the online transaction, for use in the second-factor authentication process.

Clause 15. The transaction card of clause 12 or any clause herein, wherein the QR code is generated as unique graphical information that is only decipherable by the server.

Clause 16. The transaction card of clause 12 or any clause herein, wherein the power supply is rechargeable power supply capable of being wirelessly recharged.

Clause 17. The transaction card of clause 12 or any clause herein, wherein the transaction circuitry is configured to generate new version of the QR code periodically, and
wherein, during the online transaction, the communication circuitry communicates a current version of the QR code to the server using encryption.

Clause 18. The transaction card of clause 12 or any clause herein, wherein the transaction circuitry is configured to initiate the second-factor authentication process when a transaction amount exceeds a pre-determined threshold amount.

Clause 19. The transaction card of clause 12 or any clause herein, wherein the communication component is configured to communicate with an app, installed on the wireless computing device and associated with the provider of the transaction card, which enables the provider to one or both of: (i) receive information regarding the transaction card and associated transactions, and/or (ii) send one or more of communications, new QR codes, updates, and other information to the transaction card.

Clause 20. The transaction card of clause 12 or any clause herein, wherein the transaction circuitry is configured to securely generate new QR codes, in real time, when an amount of the current online transaction exceeds a specified threshold. forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A transaction apparatus comprising:
a display;
computer readable media storing instructions that, when executed by at least one processor, cause the transaction apparatus to:
initiate, when a transaction is attempted, a second-factor authentication process;
generate a first code; and
display the first code on the display to be captured by a second-factor authentication device;
send, via an app installed in a wireless computing device, information regarding the transaction apparatus and a transaction to the wireless computing device for transmission to a server, and
receive, from the server, via the app and the wireless computing device, a second code; and
display the second code for approving the transaction.

2. The transaction apparatus of claim 1, wherein the second-factor authentication process further comprises:
transmitting, by the transaction apparatus, the first code to the server, upon generation, for use in validating the second-factor authentication process.

3. The transaction apparatus of claim 1, wherein a copy of the first code is maintained at the server to authenticate the transactions.

4. The transaction apparatus of claim 1, wherein the server associated with a provider of the transaction apparatus provides, to the transaction apparatus, the first code used to authenticate the transactions.

5. The transaction apparatus of claim 1, wherein the transaction apparatus:
i) generates the first code, on-apparatus; and
ii) transmit the first code generated to the server, during the transaction, for use in the second-factor authentication process.

6. The transaction apparatus of claim 1, wherein the first code is generated as a quick response (QR) code with unique graphical information that is only decipherable by the server.

7. The transaction apparatus of claim 1, further comprising a power supply which is a rechargeable power supply capable of being wirelessly recharged.

8. The transaction apparatus of claim 1, wherein the transaction apparatus is configured to generate new version of the first code periodically, and
wherein, during the transaction, the communication circuitry communicates a current version of the first code to the server using encryption.

9. The transaction apparatus of claim 1, wherein the transaction apparatus is configured to initiate the second-factor authentication process when a transaction amount exceeds a pre-determined threshold amount.

10. The transaction apparatus of claim 1, wherein the communication circuitry is configured to communicate with an app, installed on the wireless computing device and associated with a provider of the transaction apparatus, which enables the provider to one or both of: (i) receive information regarding the transaction apparatus and associated transactions, and/or (ii) send one or more of communications, new codes, updates, and other information to the transaction apparatus.

11. The transaction apparatus of claim 1, wherein the transaction apparatus is configured to securely generate new codes, in real time, when an amount of the online transaction exceeds a specified threshold.

12. The transaction apparatus of claim 1, wherein the display is an e-ink display.

13. A system comprising:
a server associated with a provider of a transaction apparatus;
the transaction apparatus comprising:
communication circuitry;
wherein the communication circuitry comprises wireless communication circuitry; and wherein the communication circuitry is configured to communicate with the server regarding transactions for which the transaction apparatus is used;
an display that is:
i) coupled to the communication circuitry to coordinate display of a first code; and
ii) configured to display the first code via the display for use in second-factor authentication for the transactions; and
computer readable media storing instructions that, when executed by at least one processor, cause the transaction apparatus to perform a second-factor authentication process, comprising:
initiating, when a transaction is attempted, the second-factor authentication process;
generating the first code; and
displaying the first code on display to be captured by a wireless computing device that transmits an image of the first code to the server after initiating the transaction so that the image of the first code can be verified by the server to validate the second-factor authentication process;
wherein the wireless communication circuitry is configured to:
communicate with an app, installed on the wireless computing device and associated with the provider of the transaction apparatus, to:
send, via the app, information regarding the transaction apparatus and associated transactions to the wireless computing device for transmission to the server of the provider, and
receive, via the app and the wireless computing device, one or more of: communications, new codes, updates, or other information directed to the transaction apparatus; and
generate, in response to receiving an activation instruction generated by the app and received from the wireless computing device, a second code needed to approve the transaction.

14. The system of claim 13, wherein the display is an e-ink display.

15. The system of claim 13, wherein the transaction apparatus:
i) generates the first code, on-apparatus; and
ii) transmit the first code generated to the server, during the transaction, for use in the second-factor authentication process.

16. The system of claim 13, wherein the first code is generated as a quick response code (QR) with unique graphical information that is only decipherable by the server.

17. The system of claim 13, wherein the transaction apparatus is configured to generate new version of the first code periodically, and
wherein, during the transaction, the communication circuitry communicates a current version of the first code to the server using encryption.

18. The system of claim 13, wherein the transaction apparatus is configured to initiate the second-factor authentication process when a transaction amount exceeds a predetermined threshold amount.

19. The system of claim 13, wherein the transaction apparatus is configured to securely generate new codes, in real time, when an amount of the online transaction exceeds a specified threshold.

20. A method comprising:
displaying, by a computing transaction apparatus, a first graphical code when a transaction is attempted, the first code being captured by an app running in a wireless computing device for use in a second-factor authentication process;
receiving, by the computing transaction apparatus, a second graphical code from a server via the app running in the wireless computing device; and
displaying, by the computing transaction apparatus, the second graphical code for approving the transaction.

* * * * *